United States Patent [19]
Friedmann

[11] Patent Number: 5,415,261
[45] Date of Patent: * May 16, 1995

[54] TWIN-FLYWHEEL APPARATUS FOR TRANSMITTING TORQUE IN THE POWER TRAIN OF A MOTOR VEHICLE

[75] Inventor: Oswald Friedmann, Lichtenau, Germany

[73] Assignee: Luk Lamellen und Kupplungsbau GmbH, Bühl, Germany

[ * ] Notice: The portion of the term of this patent subsequent to Nov. 16, 2010 has been disclaimed.

[21] Appl. No.: 153,579

[22] Filed: Nov. 16, 1993

Related U.S. Application Data

[62] Division of Ser. No. 708,935, May 31, 1991, Pat. No. 5,261,516.

[30] Foreign Application Priority Data

| May 31, 1990 | [DE] | Germany | 40 17 519 |
| Jun. 29, 1990 | [DE] | Germany | 40 20 759 |
| Aug. 21, 1990 | [DE] | Germany | 40 27 593 |
| Aug. 31, 1990 | [DE] | Germany | 40 27 629 |
| Aug. 31, 1990 | [DE] | Germany | 40 27 542 |
| Aug. 31, 1990 | [DE] | Germany | 40 27 614 |
| Dec. 24, 1990 | [DE] | Germany | 40 41 722 |
| Dec. 24, 1990 | [DE] | Germany | 40 41 709 |

[51] Int. Cl.$^6$ .............................................. F16D 3/14
[52] U.S. Cl. .............................. 192/70.17; 192/106.2; 74/574; 464/68
[58] Field of Search ............... 192/70.12, 70.17, 70.18, 192/106.2, 112; 74/574; 464/68, 66

[56] References Cited

U.S. PATENT DOCUMENTS

| 4,567,974 | 2/1986 | Birk | 192/70.18 |
| 5,150,777 | 9/1992 | Friedmann | 192/70.17 |
| 5,160,007 | 11/1992 | Reik et al. | 192/70.17 |
| 5,261,516 | 11/1993 | Friedmann | 492/70.17 |
| 5,293,977 | 3/1994 | Friedmann | 192/70.17 |
| 5,293,978 | 3/1994 | Reik et al. | 192/70.17 |
| 5,301,780 | 4/1994 | Jäckel | 192/70.17 |

FOREIGN PATENT DOCUMENTS

| 3941250 | 6/1990 | Germany | 192/70.17 |
| 3941251 | 6/1990 | Germany | 192/70.17 |
| 2244542 | 12/1991 | United Kingdom | 464/68 |
| 2244543 | 12/1991 | United Kingdom | 464/68 |
| 2244788 | 12/1991 | United Kingdom | 464/68 |

*Primary Examiner*—Andrea L. Pitts
*Attorney, Agent, or Firm*—Darby & Darby

[57] ABSTRACT

Apparatus for transmitting torque from the engine to the variable-speed transmission of a motor vehicle has a primary flywheel which is connectable to the crankshaft of an engine, a secondary flywheel which is coaxial with and is rotatable relative to the primary flywheel against the opposition of one or more dampers and is connectable to the input shaft of a transmission by the clutch plate of a friction clutch having a cover which is permanently separably affixed to the secondary flywheel. An antifriction bearing between the two flywheels is located at least in part radially inwardly of fasteners which extend through holes in the first flywheel to separably connect the first flywheel to the crankshaft. At least one race of the at least one bearing is or can be integral with one of the flywheels.

53 Claims, 4 Drawing Sheets

TWIN-FLYWHEEL APPARATUS FOR TRANSMITTING TORQUE IN THE POWER TRAIN OF A MOTOR VEHICLE

This is a division of application Ser. No. 07/708,935, filed May 31, 1991, U.S. Pat. No. 5,261,516.

BACKGROUND OF THE INVENTION

The invention relates to power trains for use in motor vehicles, and more particularly to improvements in apparatus for transmitting torque between the engine and the variable-speed transmission of a motor vehicle. Still more particularly, the invention relates to improvements in torque transmitting apparatus with two coaxial flywheels and one or more dampers which oppose rotation of the flywheels relative to each other.

Published German patent application No. 37 21 705 discloses a torque transmitting apparatus wherein a first flywheel is connectable to the engine and a second flywheel is connectable to the variable-speed transmission of a motor vehicle. The two flywheels can turn relative to each other against the resistance of one or more dampers. A friction clutch is interposed between the second flywheel and the transmission. The clutch plate of such clutch transmits torque from the second flywheel to the input shaft of the transmission when the clutch is engaged. The damper or dampers operate with energy storing elements which act in the circumferential direction of the flywheels.

Torque transmitting apparatus of the above outlined character are popular in motor vehicles wherein the engine and the transmission extend in the direction of forward movement of the vehicle. However, presently known torque transmitting apparatus with several coaxial flywheels cannot be used in motor vehicles with transversely mounted engine-transmission aggregates. The reason is that conventional torque transmitting apparatus with split flywheels or composite flywheels are too bulky for use in many types of compact vehicles wherein the space under the hood is very limited, particularly between the engine and the transmission. On the other hand, there exists an urgent need for torque transmitting apparatus which (a) exhibit the important advantages of those with composite flywheels and (b) are suitable for installation in compact motor vehicles including those with transversely extending engine-transmission aggregates.

OBJECTS OF THE INVENTION

An object of the invention is to provide a simple and inexpensive torque transmitting apparatus which employs several coaxial flywheels but is sufficiently compact for use in smaller motor vehicles including those with transversely extending engine-transmission aggregates.

Another object of the invention is to provide a novel and improved antifriction bearing for use between the flywheels of the above outlined torque transmitting apparatus.

A further object of the invention is to provide novel and improved flywheels for use with the aforementioned bearing.

An additional object of the invention is to provide a torque transmitting apparatus which is designed to achieve optimal torque transmitting and damping rates.

Still another object of the invention is to provide a torque transmitting apparatus which can be reassembled into a compact unit for convenient storage, transport and installation in a motor vehicle.

A further object of the invention is to provide a novel and improved method of integrating an antifriction bearing into the flywheels of the above outlined apparatus.

An additional object of the invention is to provide a novel and improved connection between a flywheel and a clutch in the above outlined apparatus.

Another object of the invention is to provide a novel and improved friction clutch for use in the above outlined torque transmitting apparatus.

A further object of the invention is to provide a power train which embodies the above outlined apparatus.

An additional object of the invention is to provide a motor vehicle which embodies the above outlined torque transmitting apparatus.

Still another object of the invention is to provide the above outlined apparatus with novel and improved means for preventing displacement or loss of certain relatively small components, such as fasteners which are used to connect the apparatus to the output element of the engine in a motor vehicle.

SUMMARY OF THE INVENTION

One feature of the present invention resides in the provision of an apparatus for transmitting torque in a motor vehicle. The apparatus comprises a first rotary flywheel which is connectable with the engine of a motor vehicle and a second flywheel which is rotatable relative to the first flywheel and is connectable with an input element of the variable-speed transmission in the vehicle. A first side of the first flywheel faces toward and a second side of the first flywheel faces away from the second flywheel. The apparatus further comprises at least one damper which is designed to oppose rotation of the flywheels relative to each other and includes energy storing elements acting in the circumferential direction of the flywheels, and at least one antifriction roller bearing between the flywheels. The flywheels define an axial passage for a component which requires centering relative to the output element of the engine, such as the aforementioned input element of the transmission, and the at least one bearing surrounds the passage and has a radially innermost portion disposed at a first radial distance from the axes of the flywheels. The first flywheel has holes which are disposed at a greater second radial distance from the axes of the flywheels, and the second flywheel has openings in at least partial alignment with the holes of the first flywheel. The apparatus is further furnished with fasteners which are insertable into the holes from the first side of the first flywheel and serve to connect the first flywheel to the engine.

One of the flywheels, particularly the first flywheel, can be provided with a hollow axial protuberance which is surrounded by the at least one bearing. The first flywheel preferably defines at least a portion of an annular chamber for the energy storing elements of the at least one damper.

The axial protuberance of the one flywheel can be surrounded by an inner race of the at least one bearing, and the outer race of such bearing is then surrounded by the other flywheel. The centers of holes in the first flywheel are preferably located radially outwardly of the outer race of the at least one bearing.

The protuberance which is surrounded by the at least one bearing can be of one piece with the inner race of such bearing. The hub of the clutch plate which forms part of the clutch can extend into the protuberance which is surrounded by the at least one bearing.

The openings in the second flywheel can be dimensioned and/or configurated in such a way that they are too small to permit passage of enlarged portions of the fasteners, i.e., of the heads of allen screws or other types of threaded fasteners which are preferably employed to connect the first flywheel to the rotary output element of the engine.

The at least one bearing can be designed in such a way that its inner or outer race is of one piece with a protuberance of one of the flywheels. The arrangement may be such that the outer race of the at least one bearing is of one piece with a protuberance of one of the flywheels.

The flywheels and the clutch (inclusive of the clutch plate of the clutch) can be assembled into a unit for convenient storage, transport and connection to the engine of a motor vehicle by connecting the first flywheel to the output element of the engine with the aforementioned fasteners. The at least one bearing can form part of such preassembled unit, and the latter can further comprise preferably deformable (e.g., elastically yieldable) means for releasably holding portions of the fasteners in the holes of the first flywheel, preferably in such a way that the fasteners extend from the first side toward but not beyond the second side of the first flywheel. The clutch plate can be centered between the pressure plate of the clutch and the second flywheel of the preassembled unit. The clutch plate can be provided with openings in at least partial alignment with the holes of the first flywheel. Additional openings can be provided in or between the elastic prongs of a diaphragm spring which forms part of the clutch and serves to bias the pressure plate against the clutch plate so that the latter bears against a friction surface of the second flywheel when the clutch is engaged so that the input element of the transmission is driven as long as the flywheels receive torque from the engine. The openings in and/or between the prongs of the diaphragm spring are in at least partial alignment with the openings of the clutch plate to permit insertion of a rotary torque transmitting tool through an opening in or between the prongs, an opening of the clutch plate and into engagement with a fastener which extends into the at least partially aligned hole of the first flywheel. The openings in and/or between the prongs and/or the openings of the clutch plate can be in full alignment or register with the holes in the first flywheel and with the openings of the second flywheel. The openings in and/or between the prongs can be equidistant from each other and be still in adequate alignment with the holes of the first flywheel, even if the holes are not equidistant, as long as the openings in and/or between the prongs of the diaphragm spring are sufficiently larger than necessary to permit passage of a torque transmitting tool through such openings and into engagement with fasteners which extend into the at least partially aligned holes. The openings in and/or between the prongs can be designed and/or dimensioned in such a way that they are too small to permit passage of enlarged portions of the fasteners, e.g., they can be designed to intercept the heads of fasteners in the form of screws having externally threaded shanks extending into the holes of the first flywheel. Alternatively, the dimensions of openings in the clutch plate can be selected in such a way that they prevent the passage of the heads of screws which are used to fasten the first flywheel to the engine.

It is equally possible to select the dimensions and/or the configuration of openings in the second flywheel in such a way that the second flywheel can intercept the heads of the screws but are large enough to permit passage of a torque transmitting tool into engagement with the heads of screws whose shanks extend into the holes of the first flywheel.

As mentioned above, the mounting of fasteners in the preassembled unit is preferably such that the shanks of fasteners can extend into but not beyond the second side of the first flywheel. The heads of the fasteners are received in a space which is defined by the clutch; such heads can be adjacent (a) the clutch plate if the openings of the clutch plate are too small for the heads, or (b) the prongs of the diaphragm spring if the openings in and/or between the prongs are too small for the heads.

The first flywheel can carry a pilot bearing for the input element of the transmission.

The cover of the clutch can be separably connected to the first or second flywheel, normally to the second flywheel. However, it is also within the purview of the invention to provide the cover with an axially extending portion which surrounds a portion of or the entire second flywheel and the peripheral surface of such portion of the second flywheel is then provided with one or more recesses for inwardly depressed projections of the axially extending portion of the cover to establish a reliable connection between the second flywheel and the cover.

At portion (such as the inner and/or the outer race) of the at least one bearing can be made of sheet metal to reduce the cost of the apparatus.

The at least one bearing can comprise at least one annulus of balls, needles, rollers or other types of rolling elements and a race having a radially extending portion which defines a track for the rolling elements. This race further comprises a radially extending portion which is rigid with one of the flywheels. Such bearing can further comprise a second race having an axially extending first portion which defines a track for the rolling elements and a radially extending second portion which is rigid with the other flywheel. One of these races surrounds the other race, and the outer (surrounding) race is preferably rigid with the second flywheel.

Each of the two races of the at least one bearing can be rigid with a different flywheel, and each of these races can be provided with a radially outwardly extending flange-like portion.

The openings of the second flywheel can be provided in a radially extending portion of one of the two races forming part of the at least one bearing.

Another feature of the invention resides in the provision of a torque transmitting apparatus which comprises a first rotary flywheel connectable with the engine of a motor vehicle, a second flywheel which is rotatable relative to the first flywheel and is connectable with the transmission of the motor vehicle, and at least one antifriction bearing between the flywheels. At least a portion of the bearing consists of sheet metal.

A further feature of the invention resides in the provision of a torque transmitting apparatus which comprises a first flywheel connectable to the engine of a motor vehicle, and a second flywheel which is rotatable relative to and is coaxial with the first flywheel and is connectable with the transmission of the motor vehicle by a clutch having a cover with a tubular portion of the cover extending axially of the flywheels and surrounding at least a portion of the second flywheel. The peripheral surface of such portion of the second flywheel has at least one recess, and the tubular portion of the cover has an inwardly extending depressed projection which extends into the recess to connect the cover to the second flywheel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
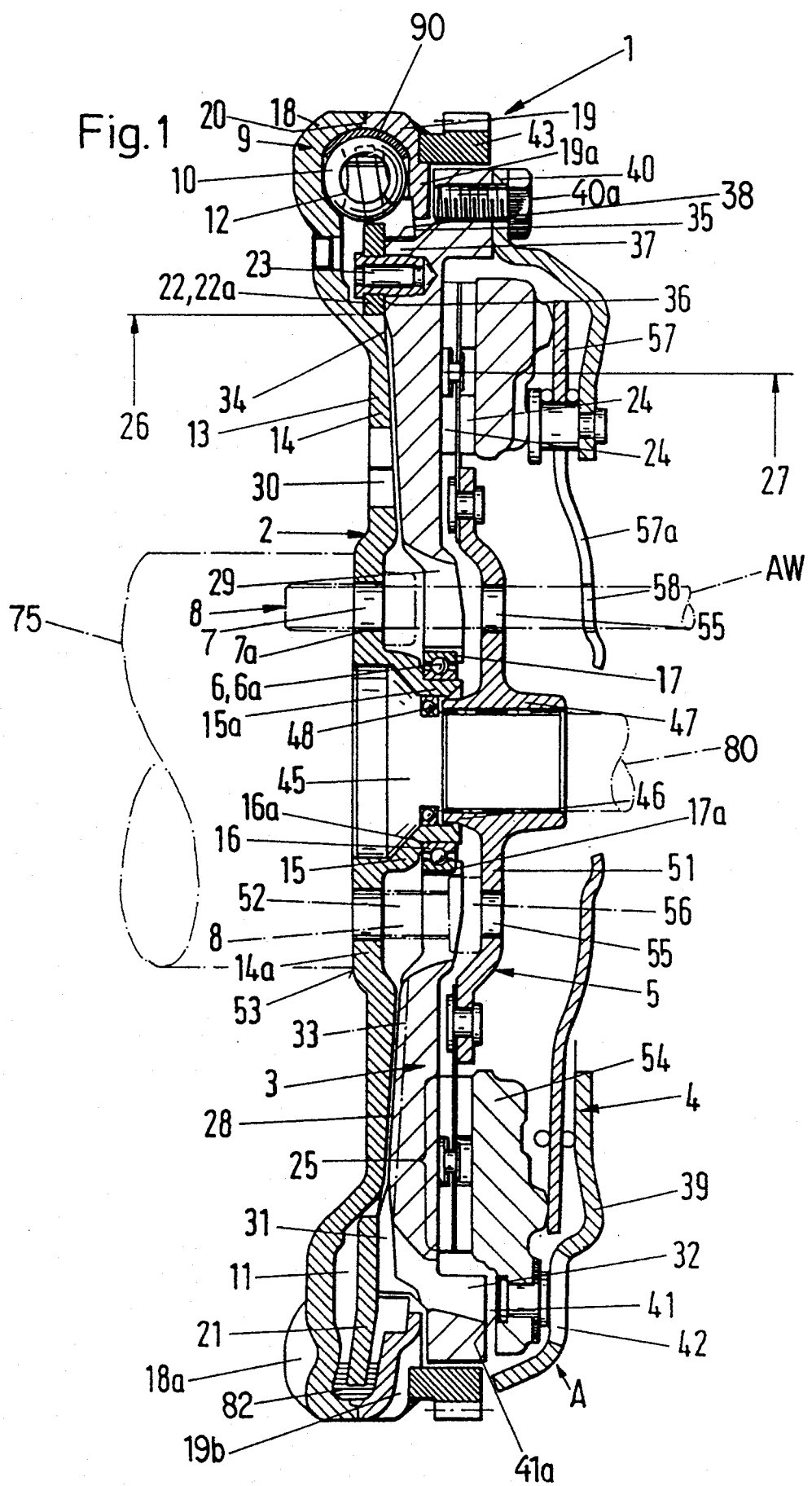
FIG. 1 is an axial sectional view of a torque transmitting apparatus which embodies one form of the invention.

FIG. 1 shows a torque transmitting apparatus 1 which can be installed between the rotary output element 75 of an internal combustion engine and the rotary input element 80 of a variable-speed transmission in a motor vehicle. The improved apparatus 1 comprises a first or primary rotary flywheel 2 which can be connected to the output element 75 by a set of fasteners in the form of screws 8 each having an externally threaded shank 52 and a larger-diameter portion or head 56. The screws 8 are allen screws, i.e., their heads have polygonal (normally hexagonal) sockets for reception of the working end of a torque transmitting tool AW (allen wrench) which is not shown in the drawing. The apparatus 1 further comprises a second or secondary flywheel 3 which is coaxial with and is rotatable relative to the primary flywheel 2 and serves to rotate the input element 80 by way of a friction clutch 4 having a clutch plate 5 with a hub 47 which axially movably but non-rotatably receives the input element 80.

An antifriction roller bearing 6 is installed between an integral hollow axial protuberance 15 of the primary flywheel 2 and the radially innermost portion of the secondary flywheel 3. In accordance with a feature of the invention, at least the radially innermost portion 16a of the inner race 16 of the bearing 6 is located radially inwardly of an annulus of holes or bores 7 which are parallel to the common axis of the flywheels 2, 3 and are provided in a main section 13 of the primary flywheel 2 to receive the shanks 52. The shanks 52 can be driven into adjacent tapped bores or holes (not specifically shown) in the output element 75 of the engine.

The apparatus 1 further comprises a damper 9 which is installed in a toroidal radially outermost portion 12 of an annular chamber 11 defined by the toroidal radially outermost portion 18 of main section 13 of the primary flywheel 2. The damper 9 comprises an annulus of energy storing elements 10 in the form of arcuate coil springs 10 which are mounted to act in the circumferential direction of the flywheels and oppose clockwise as well as counterclockwise rotation of the flywheels relative to each other from a neutral position which the flywheels assume when the engine of the motor vehicle is idle. The springs 10 are installed in the toroidal radially outermost portion 12 of the annular chamber 11. At least a portion of the chamber 11 if filled with a viscous fluid 82, such as oil or grease, which serves to lubricate the springs 10 and is sealingly confined in the chamber.

At least the main section 13 of the primary flywheel 2 is made of metallic sheet material in a suitable stamping, pressing or like machine. The holes 7 are provided in the disc-shaped radially inner portion 14 which is of one piece with the protuberance 15 and with the toroidal portion 18. The protuberance 15 resembles a sleeve and its free end portion 15a is surrounded by the inner race 16 of the bearing 6. This protuberance is located radially inwardly of the holes 7, the same as the entire bearing 6. Therefore, it possible to employ a relatively small and inexpensive bearing in contrast to those which are used in many presently known torque transmitting apparatus and are dimensioned to surround the shanks of fasteners which are used to connect the primary flywheel to the output element of the engine.

The illustrated bearing 6 has a single row of spherical rolling elements 6a which extend into tracks provided by the inner race 16 and by an outer race 17. The secondary flywheel 3 is a substantially flat disc-shaped body which is substantially coplanar with the bearing 6 and is surrounded by the toroidal portion 12 of the annular chamber 11. The inner race 16 abuts an external shoulder which is provided on the protuberance 15, and the outer race 17 abuts an internal shoulder 17a of the radially innermost portion of the secondary flywheel 3. This outer race is received in an axially extending central passage of the flywheel 3; such passage terminates at the internal shoulder.

The disc-shaped portion 14 of main section 13 of the primary flywheel 2 is integral with the toroidal portion 18 which defines the toroidal portion 12 of the chamber 11 in combination with a second section or wall 19 which constitutes a separately produced part of the primary flywheel and extends substantially radially inwardly toward the peripheral surface of the left-hand portion of the secondary flywheel 3. The section or wall 19 is welded to the toroidal portion 18, as at 20. The toroidal portion 18 has a substantially C-shaped cross-sectional outline and its internal surface rather closely follows the outlines of adjacent radially outer portions of the coil springs 10, the same as the internal surface of the radially outer portion of the wall 19. The radially outermost portion 12 of the chamber 11 contains a wear-resistant liner 90 which is contacted by the radially outer portions of the springs 10 under the action of centrifugal force when the flywheel 2 is driven by the engine.

The toroidal portion 18 is located to the left (at the engine side) of the disc-shaped portion 14, and the wall 19 is located to the right of such disc-shaped portion.

The second section of wall 19 of the primary flywheel 2 can be made of a metallic sheet material, the same as the first or main section 13. The outer parts of the toroidal portion 18 and wall 19 are substantial or exact mirror images to each other with reference to a plane which includes the welded joint 20 and halves the coil springs 10 of the damper 9. The radially inner portion 19a of the wall 19 carries a ring-shaped starter gear 43 which is connected thereto by a welded joint.

The toroidal outer portion 12 of the chamber 11 is divided into several arcuate compartments, one for each of the coil springs 10. The partitions between neighboring arcuate compartments are constituted by inwardly extending depressions 18a of the toroidal portion 18 and by similar depressions 19b in the radially outer part of the wall 19. Such depressions are obtained by providing the external surface of the portion 18 with axially extending pockets and by providing similar pockets in the external surface of the wall 19. Each compartment of toroidal portion 12 of the annular chamber 11 includes two arcuate halves, one between two neighboring depressions 18a and the other between two neighboring depressions 19b.

The secondary flywheel 3 carries stressing and torque transmitting arms 21 which extend into the chamber 11 and alternate with the coil springs 10. The arms 21 are secured to the secondary flywheel 3 by blind rivets 23 extending through the adjacent circumferentially complete portion 22a of a ring-shaped carrier 22 of arms 21. However, it is equally possible to omit the carrier 22 and to provide each arm 21 with a substantially segment-shaped base or foot which extends in the circumferential direction of the secondary flywheel 3 and is secured thereto at two or more points in a manner as described and shown in the commonly owned copending patent application Ser. No. 07/708,930 filed May 31, 1991. When the apparatus 1 is idle, i.e., when the flywheel 2 is not driven by the engine, each arm 21 is disposed between the neighboring depressions 18a and 19b.

The secondary flywheel 3 has an annular friction surface 25 which is adjacent one of two friction linings 24 on the clutch plate 5 of the friction clutch 4. At least 50% of the friction surface 25 of the flywheel 3 is preferably located radially inwardly of the carrier 22 of the torque transmitting arms 21. The inner diameter of the carrier 22 is indicated at 26, and at least 50% of the friction surface 25 is located radially inwardly of a circle having the diameter 26. Consequently, the blind rivets 23 which connect the carrier 22 to the flywheel 3 can be installed at a considerable radial distance from the common axis of the flywheels 2 and 3. This, in turn, renders it possible to design the annular space 11 in such a way that its radially inner portion does not extend inwardly beyond a circle having a diameter 27 which denotes the diameter of the median portion of the friction surface 25, i.e., of the portion midway between the radially outermost and radially innermost portions of the surface 25.

The left-hand portion of the secondary flywheel 3 extends into close or immediate proximity to the disc-shaped portion 14 of the primary flywheel 2 to define therewith a substantially radially extending narrow clearance 28 which is preferably used to promote cooling of the flywheel 3 and of neighboring parts of the apparatus. The provision of a large clearance 28 (which has a large radial dimension) is desirable and advantageous because it renders it possible to remove from the flywheel 3 and from the adjacent parts a substantial amount of heat and to thus prevent overheating of the contents of the chamber 11. The just described encapsulation or fitting of a large portion of the secondary flywheel 3 into the space within the toroidal portion 12 of the chamber 11 renders it possible to greatly reduce the axial length of the assembled torque transmitting apparatus 1 so that the latter can be put to use in compact vehicles including those with transversely extending engine and transmission. The width of the clearance 28 can be in the range of 0.5 to 4 mm. It is presently preferred to select the width of the clearance 28 in such a way that at least 50% of the clearance (as measured in the radial direction of the flywheels) has a width of 1-2 mm.

The clearance 28 can establish a portion of the path for one or more streams of cool atmospheric air which enter the clearance through substantially axially parallel openings 29 provided in the secondary flywheel 3 radially inwardly of the friction surface 25 and communicating with the radially inner portion of the clearance at the level of the heads 56 of screws 8. The openings 29 convey streams of cool atmospheric air in a direction from the inwardly projecting radial switch or prongs 57a of a diaphragm spring 57 (forming part of the clutch 4) toward the inner side of the disc-shaped portion 14 of the primary flywheel 2. The clearance 28 can receive additional streams of air by way of openings 30 which can form one or more annuli in the disc-shaped portion 14 radially outwardly of the holes 7. The openings 30 can be provided in addition to or in lieu of the openings 29; however, it is preferred to provide at least the openings 29 because they serve certain additional purposes, particularly of permitting introduction of the head of an allen wrench or another torque transmitting tool into engagement with the heads 56 of the screws 8.

Air streams which enter the clearance 28 through the openings 30 and/or 29 issue from the clearance through radially extending channels, recesses or grooves 31 which are provided in the secondary flywheel 3 and alternate with the blind rivets 23 for the carrier 22 of torque transmitting arms 21. The recesses 31 convey air radially outwardly and are provided in the left-hand side of that portion of the flywheel 3 which extends into the aforementioned space located radially inwardly of the coil springs 10. Such recesses direct air streams into substantially axially parallel openings 32 which are provided in the flywheel 3 to direct air toward the component parts of the clutch 4. The openings 32 are located radially outwardly of the channels 31 and radially outwardly of the friction surface 25. The flow of air in the clearance 28 can be promoted still further by providing the left-hand side of encapsulated portion of the flywheel 3 with one or more channels or grooves 33 (one indicated by a phantom line) each of which can convey air from an opening 29 toward a channel 31. The openings 29, 30 and 32 need not be circular; they preferably constitute arcuate slots extending in the circumferential direction of the flywheels 2 and 3. Furthermore, the openings 29 and/or 30 and/or 32 can be designed to resemble the vanes or blades of impellers in blowers and similar fluid circulating apparatus.

The means for sealing the chamber 11 from the atmosphere comprises a seal 34 which seals the clearance 28 from the radially inner portion of the chamber, and a sealing element (second seal) 35 which is disposed radially outwardly of the seal 34 and seals the toroidal portion 12 of the chamber 11 between the adjacent portion of the flywheel 3 and the radially inner portion 19a of the wall 19. The seals 34, 35 constitute integral parts of a single membrane having an intermediate portion which is clamped between the carrier 22 and the flywheel 3 by the blind rivets 23, i.e., these rivets can perform the dual function of connecting the flywheel 3 with the carrier 22 as well as with the membrane which includes the seals 34, 35.

It is equally within the purview of the invention to replace the membrane with two discrete seals each of which can constitute a membrane or a diaphragm spring.

The inner seal 34 engages the disc-shaped portion 14 of the primary flywheel 2 in a region radially outwardly of a circle having the diameter 27, i.e., radially outwardly of median portion of the friction surface 25. The seal 34 merges into a membrane portion 36 which is clamped by the rivets 23, i.e., which is located between the portion 22a of the carrier 22 and adjacent platforms 37 of the flywheel 3. The platforms 37 alternate with the radially extending channels 31 in the front or left-hand side of the flywheel 3. The portion 36 of the membrane establishes an integral connection between the seals 34, 35 and has openings for the rivets 23. The outer seal 35 bears against the radially inner portion 19a of the wall 19 at a location radially outwardly of the rivets 23 and substantially at the level of the junctions between the roots of the arms 21 and the portion 22a of the carrier 22. That portion of the membrane which connects the portion 36 with the seal 35 is denoted by the character 38 and extends in the axial direction of the flywheels. The seal 35 is located radially outwardly of the friction surface 25 on the secondary flywheel 3.

The just described selection of locations of the seals 34, 35 renders it possible to provide a large clearance 28 which extends radially outwardly a considerable distance from the space for the heads 56 of the screws 8 toward the damper 9. As mentioned above, this renders it possible to remove large quantities of heat which would be likely to reach the arms 21, the coil springs 10 and the supply 82 of viscous fluid in the chamber 11. The openings 32 are disposed radially inwardly of the seal 35 and serve to direct air against the adjacent portions of the friction clutch 4.

The openings 32 of the flywheel 3 are radially inwardly adjacent the radially outermost portion of the flywheel 3; such portion of the flywheel 3 is adjacent the external surface of the wall 19 and is separably connected to the radially outermost portion 40 of the clutch cover or housing 39 by a set of bolts, screws or other suitable fasteners 40a. The fasteners 40a are adjacent openings or ports 42 which are provided in the cover 39 and serve to promote the flow of spent air out of the interior of the clutch 4. At least some air can leave the internal space of the clutch 4 without flowing into and through the ports 42, namely radially outwardly in channels 41 which are provided between the flywheel 3 and the adjacent radially outer portion of an axially movable pressure plate 54 of the clutch 4. The channels 41 are or can be formed by suitably grooved or recessed portions of the pressure plate 54 and can further serve to receive portions of leaf springs 41a which are used to transmit torque from the cover 39 to the pressure plate 54 as well as to pull the pressure plate axially and away from the adjacent friction lining 24 on the clutch plate 6.

In order to reduce or prevent the transfer of heat from the secondary flywheel 3 into the annular chamber 11, the apparatus 1 can comprise a thermal barrier or insulator which is installed between the carrier 22 and the flywheel 3 and can constitute a layer of heat-resistant thermoplastic material. Such thermal barrier can be installed irrespective of whether all of the arms 21 are provided on a common carrier 22 or whether each arm is provided on a discrete base which is riveted or otherwise secured to the flywheel 3. The same or similar results can be achieved by making the membrane which includes the seals 34, 35 of a heat-resistant material which can constitute a thermal barrier between the flywheel 3 and the contents of the chamber 11. For example, at least the portion 36 of the membrane which includes the seals 34, 35 can be designed to constitute a thermal barrier. The thermal conductivity of the barrier (either a discrete barrier or at least the portion 36 of the membrane) is low to thus prevent overheating of viscous fluid 82 and/or of arms 21 and/or of coil springs 10.

The starter gear 43 is preferably mounted in such a way that it surrounds the radially outermost portion of the secondary flywheel 3 adjacent the radially outermost portion 40 of the cover 39.

The inner race 16 of the bearing 6 is preferably a press fit on the adjacent end portion 15a of the protuberance 15. Analogously, the outer race 17 can be a press fit in the adjacent radially innermost portion of the flywheel 3. The shoulder 17a establishes the optimal axial position of the bearing 6 relative to the flywheel 3, and the shoulder at 16a establishes the optimal axial position of the bearing relative to the flywheel 2. The planes of the two shoulders including the shoulder 17a determine the axial position of the bearing 6 in the assembled composite flywheel including the flywheels 2 and 3. These shoulders enable the bearing 6 to take up the forces which develop during disengagement of the clutch 4, namely when the free inner ends of prongs 57a of the diaphragm spring 57 are pushed toward the disc-shaped portion 14 in order to disengage the clutch 4 in that the circumferentially complete radially outer annular portion of the diaphragm spring then permits the pressure plate 54 to move axially and away from the primary flywheel 2 under the action of the leaf springs 41a.

The protuberance 15 of the primary flywheel 2 surrounds a centrally located axial passage 45 which receives a pilot bearing 48 for a component (such as the input element 80) which is to be centered relative to the output element 75, as well as the left-hand end portion 46 of the hub 47 of clutch plate 5. The pilot bearing 48 can serve to center the free end of the input element 80. This pilot bearing can be transferred into the output element 75 if the length of the input element 80 is selected in such a way that the input element extends all the way through the passage 45 and into the output element 75.

The reference character A denotes a preassembled unit A which includes the flywheel 2, 3, the clutch 4 (inclusive of the clutch plate 5) and preferably also the bearing 6 as well as the fasteners 8. The unit A can be readily manipulated during transport to storage, during transport to an automobile assembling plant or to a repair shop, as well as during attachment of the flywheel 2 to the output element 75 of the engine. The bearing 6 of the unit A is already mounted on the protuberance 15 of the primary flywheel 2. The holes 7 in the disc-shaped portion 14 receive the tips of the shanks 52 in such a way that the tips do not project beyond the exposed side 53 of the flywheel 2, namely that side which confronts the engine and faces away from the encapsulated left-hand portion of the flywheel 3 and is the outer side of a raised control part 14a of the disc-shaped portion 14. This is desirable and advantageous because it simplifies manipulation of the unit A prior to actual penetration of shanks 52 into the registering tapped bores or holes of the output element 75. The heads 56 of the screws 8 are confined in the space between the flange 51 of the clutch plate 5 and the inner side of the disc-shaped portion 14 because the shanks 52 of the screws are inserted into their holes in a direction from the right, i.e., from that (first) side of the disc-shaped portion 14 which confronts the adjacent encapsulated portion of the flywheel 3.

In order to ensure that the shanks 52 of the screws 8 are reliably held in positions corresponding to that of the lower screw 8 of FIG. 1, the holes 7 can receive deformable elastic sleeves 7a of plastic material or rubber. These sleeves hold the shanks 52 in axial positions in which the tips of the shanks 52 do not project beyond the exposed side 53 of raised central part 14a of the disc-shaped portion 14. However, when the socket in the head 56 of a screw 8 receives the working end of a rotary torque transmitting tool (such as the aforementioned allen wrench, and the tool is caused to move the screw axially in a direction to the left, the shank 52 is moved axially toward the registering tapped bore of the output element 75 and penetrates into such tapped bore in response to rotation of the respective screw.

The heads 56 of the screws 52 are prevented from leaving the internal space of the clutch 4 by the flange 51 which forms part of the clutch plate 5; this flange supports the friction linings 24 between the friction surface 25 of the flywheel 3 and the friction surface of the pressure plate 54 and is connected to or made of one piece with the hub 47.

The clutch plate 5 is accurately centered during assembly of the unit A so that it is in requisite axial alignment with the output element 75 when the latter is properly connected with the flywheel 2. This saves much time during attachment of the apparatus 1 to the engine of the motor vehicle. Furthermore, the clutch plate 5 of the pre-assembled unit A is mounted in such orientation that its openings 55 are in at least partial alignment with the openings 29 of the flywheel 3 and hence with the heads 56 of the captured screws 8. At any rate, the extent of axial alignment should suffice to ensure that the tool can be introduced through an opening 55 so as to advance its working end into the socket of the respective head 56. The openings 55 are too small to permit passage of the heads 56, i.e., the flange 51 of the clutch plate 5 acts as a means for preventing loss and/or displacement of the screws 8 which form part of the preassembled unit A.

The prongs 57a of the diaphragm spring 57 are also provided with openings 58 which are in at least partial alignment with the openings 55 of the flange 51. This renders it possible to introduce a torque transmitting tool first through an opening 58, thereupon through the at least partially aligned opening 55 and thereupon into engagement with the corresponding head 56 within the confines of the unit A. The openings 58 can constitute enlarged portions of slots between pairs of neighboring prongs 57a. Reference may be had to commonly owned U.S. Pat. No. 4,747,586 granted May 31, 1988 to Wolfgang Reik.

The dimensions and the configuration of openings 58 in the diaphragm spring 57 can be sufficiently large to permit the passage of a head 56 because the head cannot reach the prongs 57a since it is intercepted by the flange 51 of the clutch plate 5. The distribution of openings 29, 55 and 58, as well as the dimensions of these openings, are or can be selected in such a way that they enable the working end of a torque transmitting tool (normally an allen wrench) to reach any selected head 56 even if the spacing of holes 7 around the protuberance 15 is not uniform. Such non-uniform spacing of holes 7 is resorted to if it is necessary to ensure that the flywheel 2 can be connected to the output element 75 only in a single predetermined angular position. Reference may be had, for analogy, to commonly owned U.S. Pat. No. 4,493,409 granted Jan. 15, 1985 to Klaus Steeg.

In the apparatus which is shown in FIG. 1, the openings 58 are also too small to permit passage of a head 56, not because they will be called upon to prevent escape of screws 8 (this is achieved by appropriate dimensioning of the openings 55 in the flange 51 of the clutch plate 5) but rather because the provision of large openings 58 could unduly weaken the prongs 57a of the diaphragm spring 57.

The gathering of flywheels 2, 3, clutch 4, bearing 6 and fasteners 8 into a preassembled unit A brings abut a number of important advantages. Thus, centering of the clutch plate 5 between the pressure plate 54 and the flywheel 3 greatly simplifies the task of properly connecting the flywheel 2 to the output element 75 because one need not resort to a customary centering mandrel. Furthermore, the task of connecting the clutch 4 with the flywheel 3 is much simpler if such work can be carried out in the plant for the making of the torque transmitting apparatus. Still further, the screws 8 are ready to be driven into the output element 75 as soon as the latter is properly aligned with the flywheel 2, and the step of actually connecting the primary flywheel to the engine is also simpler because the operator need not be concerned with the positioning of screws 8; the shanks 52 of these screws already extend into the adjacent holes 7.

The axial position of the screw 8 which is shown in the upper half of FIG. 1 corresponds to that which this screw assumes after it has been driven home, i.e., when its head 56 bears against the inner side of raised part 14a of the disc-shaped portion 14 to prevent any stray movements of the flywheel 2 relative to the engine.

An important advantage of the improved apparatus is that it can employ a relatively small and hence inexpensive antifriction bearing. This is due to the fact that the holes 7 for the screws 8 (or any other suitable fasteners) are located radially outwardly of the radially innermost portion of the bearing and preferably radially outwardly of the radially outermost portion of such bearing.

The openings 29 in the flywheel 3 are preferably dimensioned in such a way that they permit passage of the heads 56, i.e., an entire screw 8 can be caused to pass through any one of the openings 29 to have the tip of its shank 52 properly introduced into and yieldably held by the elastic sleeve 7a in the aligned hole 7 until the head 56 is engaged and moved axially and rotated by the working end of an allen wrench or another suitable torque transmitting tool.

An advantage of the passage 45 is that it can receive one or more parts, such as the pilot bearing 48, a portion 46 of the hub 45, a portion of the input element 80 and (if necessary) a portion of the output element 75. Such distribution of the just enumerated parts also contributes to compactness of the apparatus (as seen in the axial direction of the flywheels), especially of those parts which transmit torque to the flywheel 3 and from the flywheel to the transmission. The pilot bearing 48 facilitates the mounting of the hub 46 on the input element 80 and the mounting of the input element in the primary flywheel 2 and/or in the output element 75

Figure 2:
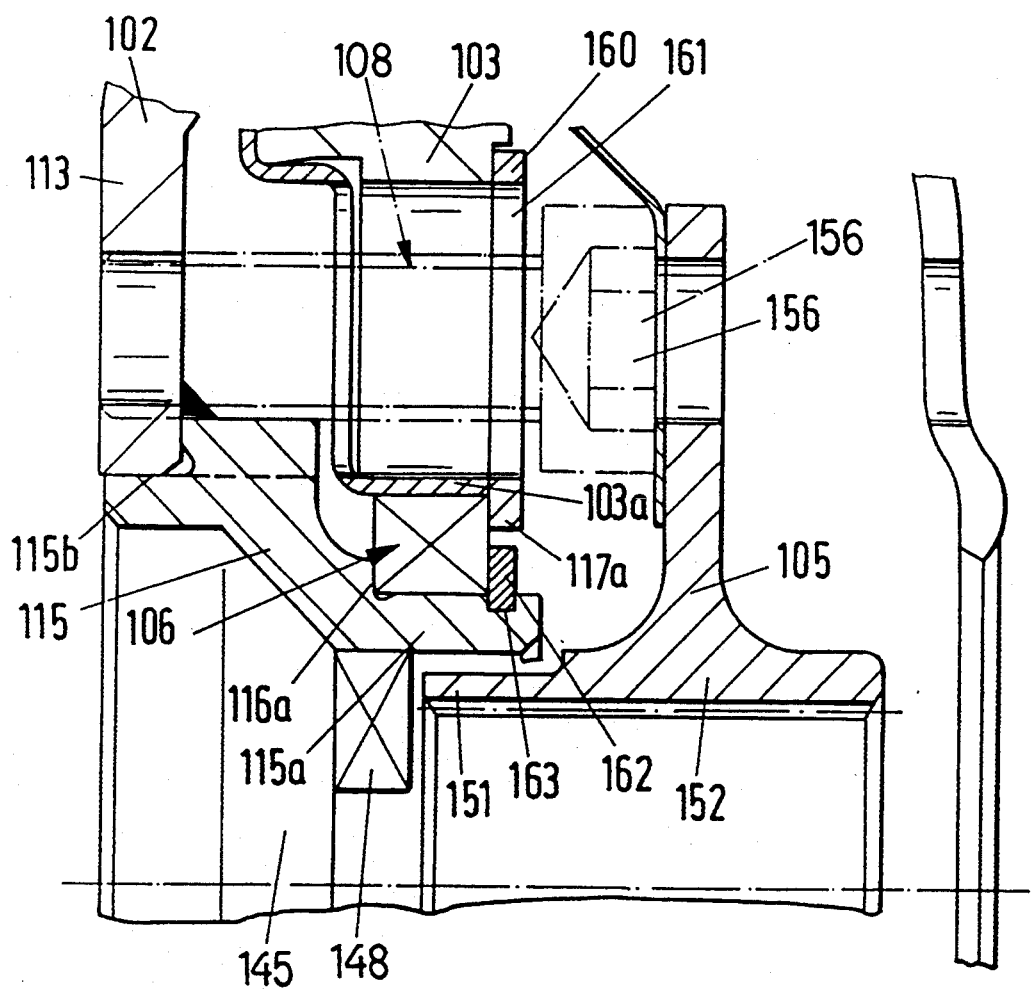
FIG. 2 is an enlarged fragmentary axial sectional view of a second apparatus wherein the inner race of the bearing is constituted by a portion of a hollow protuberance which is welded to the first flywheel.

The illustrated protuberance 15, which is of one piece with the disc-shaped portion 14 of main section 13 of the primary flywheel 2, can be replaced with a separately produced piece of pipe or sleeve which is welded or otherwise reliably connected to the disc-shaped portion 14 (reference may be had to FIG. 2, The distribution of openings 58 and/or 55 and/or 29 can be uniform even if the distribution of holes 7 is not uniform. As a rule, or in many instances, the distribution of holes 7 departs from a uniform distribution (i.e., with the centers of neighboring holes located at a single predetermined distance from each other, as seen in the circumferential direction of the flywheel 2, only to a very small extent which should suffice to permit connection of the flywheel 2 to the output element 75 in a single predetermined position. Under such circumstances, the openings 29, 55 and 58 can be respectively equidistant from each other (in the circumferential direction of the flywheel 3., flange 51 and the set of prongs 57a, respectively) if such openings are sufficiently larger than necessary in order to introduce a rotary tool to an extent which suffices to compensate for non-uniform distribution of the holes 7.

The clutch plate 5 can be reached and removed (when necessary, e.g., due to extensive wear upon the friction linings 24) by the simple expedient of removing the fasteners 40a so that the cover 39 of the clutch 4 can be detached from the secondary flywheel 3.

FIG. 2 shows a portion of a second torque transmitting apparatus having an antifriction roller bearing 106 between the flywheels 102 and 103. The main section 113 of the primary flywheel 102 is provided with a separately produced hollow sleeve-like or tubular protuberance 115. The latter is welded or otherwise securely connected to the disc-shaped portion of the main section 113 which is made of sheet metal. The protuberance 115 is provided with an annular recess 115b which extends in the axial and radial directions of the flywheel 102 and receives the radially innermost portion of the main section 113 to ensure that the protuberance is properly centered and is held in a predetermined axial position.

The end portion 115a of the protuberance 115 is of one piece with the inner race of the bearing 106, i.e., this end portion 115a constitutes the inner race and provides one or more tracks for the annulus or annuli of rolling elements forming part of the bearing 106. The outer race of the bearing 106 is constituted by or is a press fit in a sleeve or insert 103a which overlies the radially innermost portion of the secondary flywheel 103 and consists of a heat-resistant material exhibiting a low thermal conductivity. For example, the sleeve or insert 103a can be a press fit in the flywheel 103 and can be made of a suitable plastic material. This insert can be said to constitute a thermal barrier which prevents overheating of the bearing 106.

A ring-shaped projection 117a which determines the axial position of the outer race of the bearing 106 forms part of a washer-like retainer 160 which is riveted or otherwise reliably connected to the flywheel 103. The retainer 160 has axially parallel openings 161 which are large enough to permit passage of the heads 156 of screws 108. The hub 152 of the clutch plate 105 has an end portion 151 which extends into the axial passage 145 within the protuberance 115. The passage 145 receives a pilot bearing 148 for the input element (not shown) of the transmission. The pilot bearing 148 is centered in the protuberance 115.

The reference character 162 denotes a split ring which is used to secure the bearing 106 against axial movement away from the shoulder 116a of the protuberance 115. This split ring can be replaced with a circumferentially complete elastically deformable ring which must be capable of being introduced into the external grooves 163 in end portion 115a of the protuberance 115. The groove 163 is adjacent that part of the protuberance 115 which is nearest the flange of the clutch plate 105. The ring 162 cooperates with the shoulder 116a to locate the bearing 106 in the axial direction of the flywheels 102 and 103.

Figure 3:
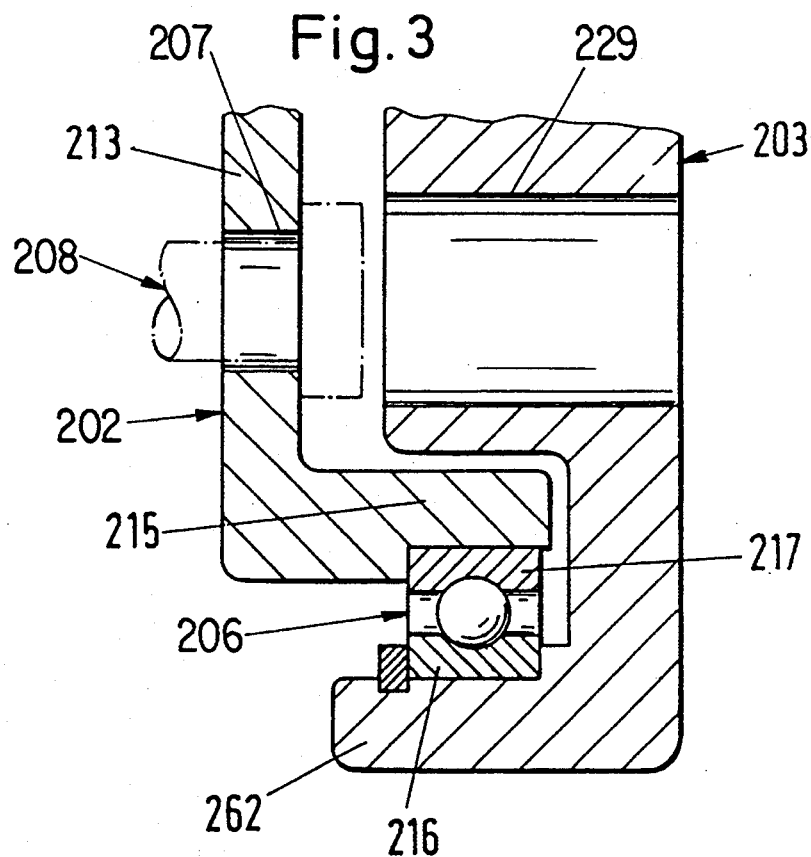
FIG. 3 is a fragmentary axial sectional view of an apparatus wherein each race of the bearing engages an integral protuberance of the respective flywheel.

Referring to FIG. 3, there is shown a portion of a torque transmitting apparatus wherein the antifriction bearing 206 between the flywheels 202 and 203 has a single annulus of rolling elements and is surrounded by an integral sleeve-like axial protuberance 215 of the primary flywheel 202. The protuberance 215 has a shoulder to prevent leftward axial movement of the outer race 217. The inner race 216 of the bearing 206 surrounds an axial protuberance 262 of the secondary flywheel 203. This inner race is held in a predetermined axial position by a shoulder of the protuberance 262 and by a split ring. The protuberances 215, 262 are in partial radial alignment, i.e., the protuberance 215 is disposed radially outwardly of and spacedly surrounds the protuberance 262, to define an annular space for the bearing 206. The protuberance 215 is made of one piece with the main section 213 of the primary flywheel 202, and the protuberance 262 is of one piece with the secondary flywheel 203. FIG. 3 further shows a hole 207 in the main section 213 radially outwardly of the bearing 206, an opening 229 in the flywheel 203 in at least partial alignment with the hole 207, and an allen screw 208 which has a shank extending into the registering tapped bore of the output element (not shown) of an internal combustion engine.

The integral protuberance 215 can be replaced with a separately produced piece of tube or sleeve (not shown) which is welded or otherwise rigidly connected with the main section 213 of the primary flywheel 202.

The bearing between the primary and secondary flywheels will be designed in such a way that its inner and/or its outer race is integral with the adjacent portion of the respective flywheel if the torque transmitting apparatus is very small. Thus, the bearing can consist of one or more annuli of spherical, barrel-shaped, needle-shaped or other suitable rolling elements and a single discrete race (the other race is of one piece with the primary or secondary flywheel), or merely of one or more annuli of rolling elements (if each race of the bearing is of one piece with the respective flywheel). For example, the inner race 16 in the bearing 6 of FIG. 1 can be omitted if the protuberance 15 provides a track for the rolling elements 6a. As to FIG. 3, the outer race 217 can be omitted if the protuberance 215 provides a track for the rolling elements of the bearing 206 and/or the inner race 216 can be omitted if the protuberance 262 provides a track for the rolling elements.

Figure 4:
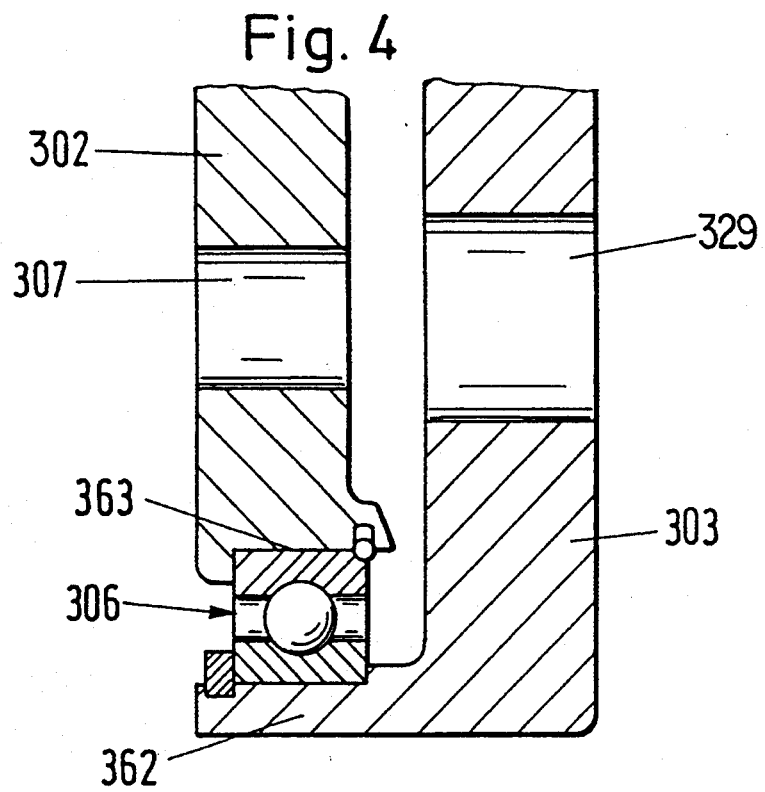
FIG. 4 is a fragmentary axial sectional view of a fourth apparatus wherein the bearing is disposed in the general plane of the first flywheel.

FIG. 4 shows a portion of a torque transmitting apparatus wherein only the secondary flywheel 303 is provided with a hollow axial protuberance 362 inwardly adjacent the inner race of the antifriction bearing 306. The outer race of the bearing 306 is received in an axially extending ring-shaped recess 363 in the internal surface of the primary flywheel 302. The bearing 306 is located radially inwardly of the holes 307 (only one shown) in the disc-shaped portion of main section of the flywheel 302. The flywheel 303 has an opening 329 in at least partial but preferably full alignment with the hole 307.

Figure 5:
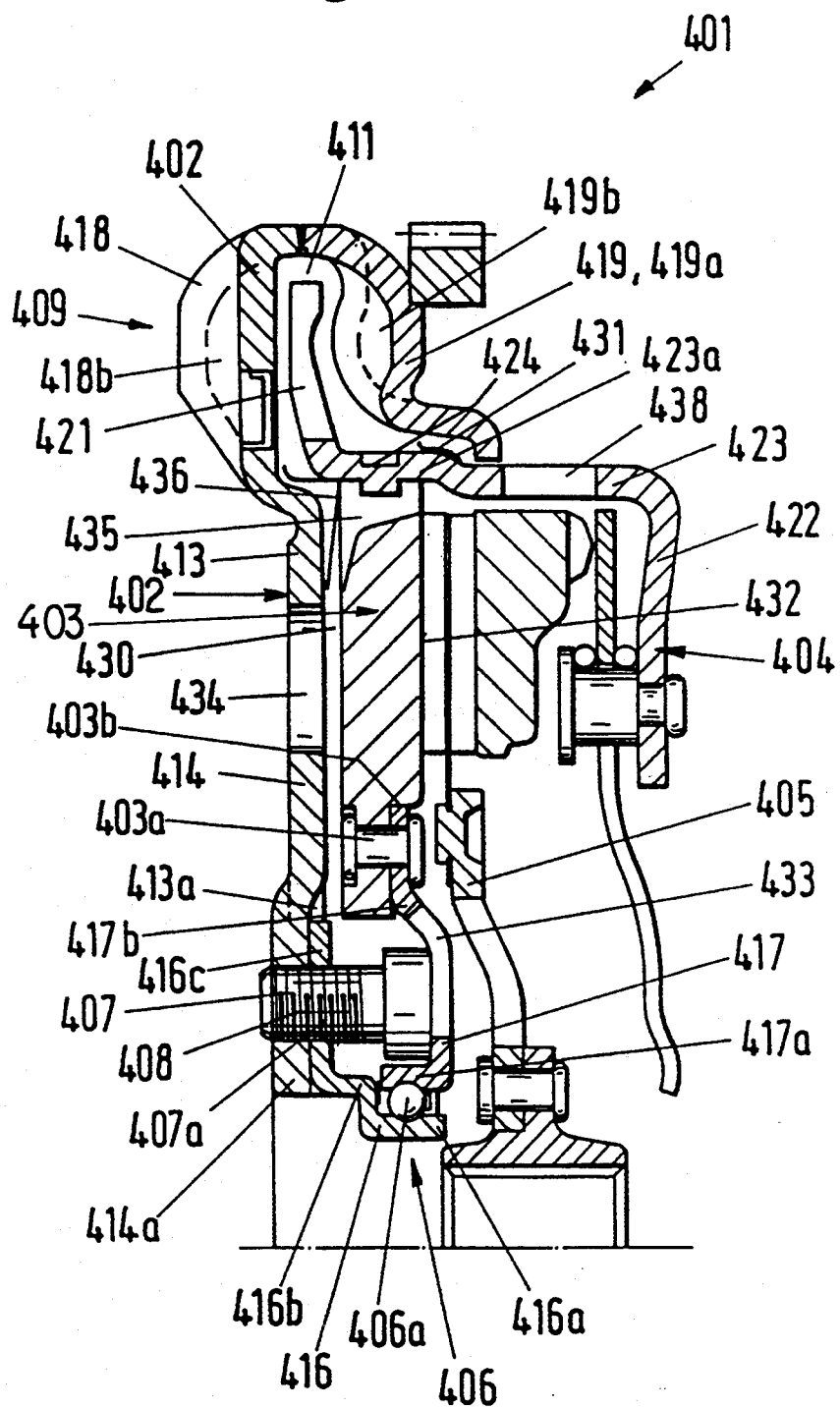
FIG. 5 is a fragmentary axial sectional view of an apparatus with a bearing having both races made of sheet metal.

Referring to FIG. 5, there is shown a portion of a torque transmitting apparatus 401 with coaxial primary and secondary flywheels 402, 403. The flywheel 402 is connectable to the output element (not shown) of an engine by fasteners in the form of allen screws 408, and the flywheel 403 is connectable to the input element (not shown) of a variable-speed transmission by way of a friction clutch 404 having a clutch plate 405 with a hub which is slidable on but cannot rotate relative to the input shaft. The antifriction bearing 406 between the two flywheels is located radially inwardly of the holes 407 for the screws 408 and its single annulus of spherical rolling elements 406a is confined between an inner race 416 and an outer race 417. A damper 409 is employed to oppose rotation of the flywheels 402, 403 relative to each other, and this damper has at least one annulus of arcuate coil springs (not shown in FIG. 5) which extend and act in the circumferential direction of the flywheel 402. The coil springs of the damper 409 are confined in the radially outermost portion of an annular chamber 411 which is defined in part by the main section 413 and in part by the second section or wall 419 of the flywheel 402. The chamber 411 is at least partially filled with a viscous fluid, such as oil or grease.

The sections 413, 419 of the primary flywheel 402 are made of sheet metal, and the main section 413 includes a substantially radially extending disc-shaped portion 414 which is provided with the holes 407, and a toroidal portion 418 which is of one piece with the portion 414 and is welded to the radially outer part of the wall 419. The radially inner portion 419a of the wall 419 extends toward and close to the external surface of an axially extending portion 423 of a housing or cover 422 forming part of the friction clutch 404.

The races 416, 417 of the antifriction bearing 406 are made of sheet metal. The inner race 416 is centered by the radially innermost part of the disc-shaped portion 414 and includes an axially extending cylindrical portion 416a (this is the actual inner race the external surface of which provides a track for the rolling elements 406a), a radially extending intermediate portion 416b, another axially extending cylindrical portion between the part 414a of disc-shaped portion 414 and the rolling elements 406a, and a flange-like radially outwardly extending portion 416c which is welded or otherwise reliably affixed to the primary flywheel 402 and extends in part into an annular centering recess 413a in the inner side of the disc-shaped portion 414. The outer race 417 includes an axially extending cylindrical portion 417a (the actual outer race the external surface of which defines a track for the rolling elements 406a), and an axially extending flange-like portion 417b which is welded or otherwise reliably affixed to the radially innermost portion of the secondary flywheel 403. FIG. 5 shows that the flange-like portion 417b of the outer race 417 is affixed to the flywheel 403 by rivets 403a.

The axially extending cylindrical portion 416a of the inner race 416 is at least substantially coplanar with the secondary flywheel 403 and is coplanar with the axially extending portion 417a of the outer race 417 (namely as seen in a direction at right angles to the common axis of the flywheels 402, 403).

The recess 413a is configured and dimensioned in such a way that the inner race 416 is centered on the primary flywheel 402 when the flange-like radially extending portion 416c is properly received in 413a. The recess 413c can consist of several substantially radially extending arms each of which can receive a complementary prong of the flange-like portion 416c to simplify centering of the portion 416c on the disc-shaped portion 414 of main section 413 of the flywheel 402. Each hole 407 can be in radial alignment with one arm of the recess 413a. The width of each arm of the recess 413a can be the same as the diameter of a hole 407. When the screws 408 are applied to connect the flywheel 402 to the output element of the engine, the prongs of the flange-like portion 416c are caused to enter the respective arms of the recess 413a to thus automatically center the inner race 416 relative to the disc-shaped portion 414. The screws 408 then clamp the radially innermost part 414a of the disc-shaped portion 414 between the output element of the engine and the flange-like portion 416a of the inner race 416. Thus, the inner race 416 need not be positively connected to the flywheel 402 because a reliable connection between 402 and 416 is established by the screws 408 in automatic response to proper attachment of the flywheel 402 to the engine.

The flywheel 403 has an axially extending annular recess 403b for the radially outermost part of the flange-like portion 417b. The outer race 417 is properly centered on the flywheel 403 when the radially outermost part of the portion 417b is properly received in the recess 403b.

The toroidal portion 418 of the main section 413 of the primary flywheel 402 is integral with the disc-shaped portion 414 and has a substantially C-shaped cross-sectional outline so that it can closely follow the outlines of adjacent portions of coil springs in the toroidal radially outermost portion of the chamber 411. The coil springs of the damper 409 can actually bear against the internal surface of the portion 418 and against the internal surface of the radially outermost portion of the wall 419 when the apparatus 401 is in use, i.e., when the flywheels 402, 403 rotate and the coil springs of the damper 409 are acted upon by centrifugal force.

FIG. 5 shows that the toroidal portion 418 is axially offset relative to the disc-shaped portion 414 in a direction toward the engine. As already described in connection with FIG. 1, the toroidal portion of the chamber 411 is subdivided into arcuate compartments, one for each coil spring of the damper 409, and the compartments are separated from each other by partitions each of which includes a depression 418b in the toroidal portion 418 and a depression 419b in the radially outer portion of the wall 419. The arms 421 are integral parts of the axially extending portion 423 of the cover 422 and are bent radially outwardly and extend into the toroidal portion of the chamber 411. Each arm 421 extends between two neighboring coil springs of the damper 409, and each of these arms is flanked by a pair of axially aligned depressions 418b, 419b when the engine does not rotate the flywheel 402. The coil springs of the damper 409 are caused to store energy irrespective of the direction of rotation of the flywheel 402 relative to the flywheel 403 and/or vice versa. This is due to the fact that each coil spring is confined between two arms 421 and also between two pairs of axially aligned depressions 418b, 419b. Such mode of operation of a damper with circumferentially acting energy storing elements is known in the art.

The means for connecting the cover 422 with the secondary flywheel 403 comprises recesses in the peripheral surface of that portion of the flywheel 403 which is surrounded by the cover 422 and depressions 424 or depressed portions which are displaced from the axially extending portion 423 and fill the adjacent recesses. Such connecting means ensures that the cover 422 is rigidly connected with the flywheel 403, not only in the axial direction but also in the circumferential direction of the flywheels. That part of the axially extending portion 423 which actually surrounds the flywheel 403 and is provided with depressions 424 is indicated by the character 423a. The axially extending portion 423 can be provided with an internal shoulder (not referenced) which serves as an abutment for the flywheel 403 to thus ensure that the recesses in the peripheral surface of the flywheel 403 are located within the part 423a before the part 423a is deformed to form depressions 424 which couple the cover 422 to the secondary flywheel. The connection including the depressions 424 replaces the connecting means including the fasteners 40a of FIG. 1.

The toroidal portion of the annular chamber 411 is located radially outwardly of the entire secondary flywheel 403, either in its entirety or to a major extent. Therefore, at least the major part if not the entire secondary flywheel 403 can be encapsulated or fitted into the space which is defined by the primary flywheel 402 and is surrounded by the annular chamber 411. Consequently, the disc-shaped portion 414 and the secondary flywheel 403 define a large clearance 430 which extends radially all the way from the inner race 416 to a seal 436 between this clearance and the radially inner portion of the chamber 411. A large clearance 430 is desirable and advantageous because it renders it possible to circulate large quantities of cool atmospheric air in order to remove heat which is generated as a result of slippage between the annular friction surface 432 of the secondary flywheel 403 and the adjacent friction lining of the clutch plate 405 when the flywheel 403 is free to rotate relative to but rubs against the adjacent friction lining. Another advantage of the provision of a clearance 430 which is defined directly by adjacent parts of the two flywheels is that the improved apparatus is more compact than heretofore known apparatus (as seen in the axial direction of its flywheels). Thus, it is not necessary to employ a flange-like torque transmitting member which is a standard part of heretofore known torque transmitting apparatus, which has arms extending between the coil springs of the damper, which extends into the space between the two flywheels, and which is connected to and rotates with the secondary flywheel. Reference may be had to FIG. 1 of commonly owned U.S. Pat. No. 4,989,710 granted Feb. 5, 1991 to Wolfgang Reik and Hans-Dieter Elison. This patent further shows an engine, a transmission, a crankshaft which is part of the engine and is connectable to the primary flywheel, and an input shaft which is part of the variable-speed transmission and is rotatable by the clutch plate of the friction clutch. The latter is mounted on the secondary flywheel.

The manner of sealing the chamber 411 from the clearance 430 and from the atmosphere also contributes to compactness of the preassembled unit and of the entire torque transmitting apparatus 401. Thus, the sealing means is designed and installed to permit practically complete penetration or fitting of the secondary flywheel 403 and of a substantial part of the friction clutch 404 into the space which is defined by the primary flywheel 402 within the chamber 411 and begins immediately adjacent the disc-shaped portion 414. The sealing means comprises a first seal 431 between the frustoconical radially innermost part of radially extending portion 419a of the wall 419 and the external surface of axially extending portion 423 of the cover 422.

The clearance 430 serves to convey streams of air between the flywheels and to withdraw heat from the flywheel 403. The flange-like portion 417b of the outer race 417 of the bearing 406 has substantially axially parallel openings 433 which are disposed radially inwardly of the friction surface 432 and radially inwardly of the rivets 403a and admit atmospheric air into the radially inner portion of the clearance 430. The inflowing air streams impinge upon the inner side of the disc-shaped portion 414 and flow radially outwardly in the clearance 430 to leave the clearance through openings 434 in the main section 413 of the primary flywheel 402 (i.e., toward the engine) and/or toward and into substantially axially parallel openings 435 which are provided in the peripheral surface of the flywheel 403 inwardly adjacent the axially extending portion 423 of the cover 422. Such air enters the interior of the clutch 404 and can escape into the atmosphere through openings or ports 438 in the portion 423. The openings 433 can be omitted if the main section 413 is provided with openings 434 and vice versa. Air streams which flow through the openings 435 are inwardly adjacent the seal 436 which is provided between the clearance 430 and the radially inner portion of the chamber 411. Such air streams flow from the left-hand side of the flywheel 403, along the inner side of the axially extending portion 423 and into the interior of the cover 422 to the right of the pressure plate of the clutch 404. The openings 433, 434 and/or 435 can constitute elongated slots which extend in the circumferential direction of the two flywheels. The openings 433 serve the additional function of affording access to the heads of the screws 408 or of permitting introduction of screws 408 (inclusive of their heads) into the space to the left of the flange-like portion 417b of the outer race 417.

The seal 436 can constitute a membrane or a diaphragm spring which bears against the inner side of the disc-shaped portion 414 and reacts against the axially extending portion 423 of the cover 422 or vice versa. The location of this seal 436 is preferably selected in such a way that it is disposed radially outwardly of half the distance between the radially innermost and radially outermost portions of friction surface 432 on the flywheel 403. The radially outermost portion of the seal 436 is centered by a shoulder of the axially extending portion 423 immediately radially outwardly of openings 435 in the peripheral surface of the flywheel 403.

The installation of the seal 436 so close to the toroidal portion of the space 411 that the seal actually engages the axially extending portion 423 of the cover 422 ensures that the clearance 430 is wide (as seen in the radial direction of the flywheels 402, 403) and can contain a large quantity of cool atmospheric air which flows radially outwardly from the openings 434 and/or 433 toward and into the openings 435, i.e., the cooling system of the apparatus 401 can remove large quantities of heat which develops at the friction surface 432 of the secondary flywheel. The openings 435 are located radially inwardly of the seal 431 and convey air along this seal to discharge the conveyed air into the friction clutch 404.

The flywheels 402, 403, the clutch 404, the bearing 406 and the fasteners 408 constitute a preaasembled unit which exhibits the same advantages as the unit A of FIG. 1. All such details of the clutch 404 which are not specifically described are conventional or correspond to those of the clutch 4 in the apparatus 1 of FIG. 1.

The improved torque transmitting apparatus is susceptible of many additional modifications without departing from the spirit of the invention. For example, the features of the apparatus of FIG. 1 can be combined with those of the apparatus of FIG. 2, 3, 4 or 5, the features of the a apparatus of FIG. 2 can be combined with those of the apparatus of FIG. 3, 4 or 5, and so forth. Furthermore, the apparatus can employ two or more dampers which operate in series or in parallel, the main section of the primary flywheel can be assembled of two or more separately produced parts, the antifriction bearing can be provided with two or more annuli of rolling elements, and the flywheels can be mounted on two or more antifriction bearings.

What is claimed is:

1. Apparatus for transmitting torque in a motor vehicle, comprising a first rotary flywheel connectable with an engine of a vehicle; a second flywheel rotatable relative to said first flywheel and connectable with an input element of a transmission in the vehicle by a clutch, said first flywheel having a first side facing toward and a second side facing away from said second flywheel; at least one damper operative to oppose rotation of said flywheels relative to each other and including energy storing elements acting in a circumferential direction of said flywheels; at least one antifriction roller bearing between said flywheels, said flywheels defining an axial passage for a component, such as the input element of the transmission, and said at least one bearing surrounding said passage and having a radially innermost portion disposed at a first radial distance from an axes of said flywheels, said first flywheel having holes disposed at a greater second radial distance from said axes and said second flywheel having openings in at least partial alignment with said holes; and fasteners insertable into said holes from said first side to connect said first flywheel to the engine, wherein said clutch comprises a cover having an axially extending portion surrounding a portion of said second flywheel, said portion of said second flywheel having a peripheral surface and at least one recess in said peripheral surface, said axially extending portion including an inwardly depressed projection extending into said at least one recess and connecting said cover to said second flywheel.

2. An apparatus for transmitting torque, said apparatus being a pre-mounted unit for use between a driving motor and a transmission, comprising:

a flywheel, a clutch being attached to said flywheel, a pressure plate having a damper centrally located between a friction surface of the flywheel and a friction surface of the pressure plate, whereby the flywheel has holes for receiving fastening means for the fastening of the pre-mounted unit to an output element, said fastening means being fixedly attached to said unit, a diaphragm spring having an inwardly projecting prong in an area of said damper, said prong having a first plate spring opening, a clutch plate being coupled to said pressure plate, said clutch plate having a second plate spring opening, said plate spring openings being at least partially axially overlapping with respect to said holes in said flywheel and are formed to accommodate passage of a tool for the movement of said fastening means.

3. The apparatus of claim 2, further comprising a means for releasably holding a portion of said fasteners in said openings.

4. The apparatus of claim 3, wherein said holding means is deformable.

5. The apparatus of claim 2, wherein the openings in said switch are larger than necessary for the passage of the tool and are equidistant from each other in the circumferential direction of said flywheel so that they permit passage of the tool into engagement with a plurality of fasteners extending into holes which are in mere partial alignment with said equidistant openings.

6. The apparatus of claim 5, wherein said fasteners have enlarged portions and the openings are too small to permit passage of said enlarged portions.

7. The apparatus of claim 5, wherein said fasteners have enlarged portions and the openings of said clutch plate are too small to permit passage of said enlarged portions.

8. The apparatus of claim 5, wherein each of said fasteners includes a threaded shank extending into one of said holes from a first side toward but not beyond a second side of said flywheel facing away from said clutch, an enlarged portion of said fasteners constituting heads at the first side of said flywheel and said clutch having an internal space for said heads.

9. The apparatus of claim 2, further comprising means for separably connecting said clutch to said flywheel.

10. The apparatus of claim 2, wherein said flywheel comprises a first flywheel connectable with an engine of a vehicle; a second flywheel rotatable relative to said first flywheel and connectable with an input element of a transmission in the vehicle by said clutch, said first flywheel having a first side facing toward and a second side facing away from said second flywheel; at least one damper operative to oppose rotation of said flywheels relative to each other and including energy storing elements acting in the circumferential direction of said flywheels; at least one antifriction roller bearing between said flywheels.

11. The apparatus of claim 10, wherein said antifriction roller bearing has a radially innermost portion disposed at a first radial distance from the axes of said flywheels, said first flywheel having said holes disposed at a greater second radial distance from said axes and said second flywheel having openings in at least partial alignment with said holes; and fasteners insertable into said holes from said first side to connect said first flywheel to the engine.

12. The apparatus of claim 10, wherein said first flywheel is provided with a hollow axial protuberance and said at least one bearing surrounds said protuberance.

13. The apparatus of claim 10, wherein said first flywheel defines at least a portion of an annular chamber for said energy storing elements.

14. The apparatus of claim 11, one of said flywheels has a hollow axial protuberance and said at least one bearing includes an inner race surrounding said protuberance and an outer race surrounded by the other of said flywheels, said holes having centers located radially outwardly of said outer race.

15. The apparatus of claim 10, wherein one of said flywheels includes a hollow axial protuberance with is surrounded by said at least one bearing, said protuberance being of one piece with said one flywheel.

16. The apparatus of claim 10, wherein one of said flywheels has a hollow axial protuberance which is surrounded by said at least one bearing and said clutch plate having a hub extending into said protuberance.

17. The apparatus of claim 11, wherein said fasteners include enlarged portions and said openings are too small to permit passage of said enlarged portions.

18. The apparatus of claim 10, wherein said clutch plate is centered between said pressure plate and said second flywheel.

19. The apparatus of claim 11, wherein said openings are sufficiently large to permit introduction of a torque transmitting tool into engagement with fasteners extending into the at least partially aligned holes of said first flywheel.

20. The apparatus of claim 10, further comprising a pilot bearing in said first flywheel.

21. The apparatus of claim 10, wherein said enlarged portion of said fasteners constitute heads disposed between said holes of said first flywheel and said openings of said second flywheel in an inserted condition of said fasteners.

22. Apparatus for transmitting torque in a motor vehicle, comprising:
a first rotary flywheel connectable with an engine of a vehicle;
a second flywheel rotatable relative to said first flywheel and connectable with an input element of a transmission in the vehicle by a clutch, said first flywheel having a first side facing toward and a second side facing away from said second flywheel;
at least one damper operative to oppose rotation of said flywheels relative to each other and including energy storing elements acting in a circumferential direction of said flywheels;
at least one antifriction roller bearing between said flywheels, said flywheels defining an axial passage for a component, and said at least one bearing surrounding said passage and having a radially innermost portion disposed at a first radial distance from an axes of said flywheels, said first flywheel having holes disposed at a greater second radial distance from said axes and said second flywheel having openings in at least partial alignment with said holes;
and a plurality of fasteners insertable into said holes from said first side to connect said first flywheel to the engine, wherein said antifriction roller bearing surrounds an axial protuberance of one of said flywheels, said axial protuberance defines a passage to receive a component.

23. The apparatus according to claim 22, wherein said fasteners are fixedly integrated with said first flywheel.

24. The apparatus of claim 22, wherein said first flywheel is provided with a hollow axial protuberance and said at least one bearing surrounds said protuberance.

25. The apparatus of claim 24, wherein said first flywheel defines at least a portion of an annular chamber for said energy storing elements.

26. The apparatus of claim 22, wherein one of said flywheels has a hollow axial protuberance and said at least one bearing includes an inner race surrounding said protuberance and an outer race surrounded by the other of said flywheels, said holes having centers located radially outwardly of said outer race.

27. The apparatus of claim 22, wherein one of said flywheels includes a hollow axial protuberance which is surrounded by said at least one bearing, said protuberance being of one piece with said one flywheel.

28. The apparatus of claim 22, wherein one of said flywheels has a hollow axial protuberance which is surrounded by said at least one bearing and said clutch comprises a clutch plate having a hub extending into said protuberance.

29. The apparatus of claim 22, wherein said fasteners include enlarged portions and said openings are too small to permit passage of said enlarged portions.

30. The apparatus of claim 22, wherein one of said flywheels has a hollow axial protuberance and said at least one bearing has a race of one piece with said protuberance.

31. The apparatus of claim 30, wherein said at least one bearing has an inner race and an outer race, said outer race being of one piece with said protuberance.

32. The apparatus of claim 22, wherein said clutch comprises a clutch plate, said flywheels and said clutch together constituting a preassembled unit which is connectable to the engine by connecting said fasteners with a rotary output element of the engine.

33. The apparatus of claim 22, wherein said at least one bearing forms part of said unit.

34. The apparatus of claim 22, further comprising means for releasably holding portions of said fasteners in said holes.

35. The apparatus of claim 34, wherein said holding means is deformable.

36. The apparatus of claim 22, wherein said clutch comprises a pressure plate and a clutch plate which is centered between said pressure plate and said second flywheel.

37. The apparatus of claim 36, wherein said clutch plate has openings in a least partial alignment with said holes.

38. The apparatus of claim 37, wherein said clutch further comprises a diaphragm spring arranged to bias said pressure plate against said clutch plate, said spring having prongs provided with openings in at least partial alignment with the openings of said clutch plate to permit insertion of a torque transmitting tool through an opening of said prongs, an opening of said clutch plate and into engagement with a fastener which extends into the at least partially aligned hole of said first flywheel.

39. The apparatus of claim 38, wherein the openings of said prongs and of said clutch plate are in register with said holes.

40. The apparatus of claim 38, wherein the openings in said prongs are larger than necessary for the passage of the torque transmitting tool and are equidistant from each other in the circumferential direction of said flywheels so that they permit passage of the tool into engagement with fasteners extending into holes which are in mere partial alignment with said equidistant openings.

41. The apparatus of claim 38, wherein said fasteners have enlarged portions and the openings of said prongs are too small to permit passage of said enlarged portions.

42. The apparatus of claim 37, wherein said fasteners have enlarged portions and the openings of said clutch plate are too small to permit passage of said enlarged portions.

43. The apparatus of claim 22, wherein said openings are sufficiently large to permit introduction of a torque transmitting tool into engagement with fasteners extending into the at least partially aligned holes of said first flywheel.

44. The apparatus of claim 22, wherein said flywheels, said at least one bearing, said clutch and said fasteners together constitute a preassembled unit and each of said fasteners includes a threaded shank extending into one of said holes from said first side toward but not beyond the second side of said first flywheel, an enlarged portion of said fasteners constituting heads at the first side of said first flywheel and said clutch having an internal space for said heads.

45. The apparatus of claim 22, further comprising a pilot bearing in said first flywheel.

46. The apparatus of claim 22, further comprising means for separably connecting said clutch to one of said flywheels.

47. The apparatus of claim 22, wherein a portion of said at least one bearing consists of sheet metal.

48. The apparatus of claim 22, wherein said at least one bearing comprises at least one annulus of rolling elements and a race having an axially extending portion defining a track for said rolling elements and a radially extending portion rigid with one of said flywheels.

49. The apparatus of claim 48, wherein said at least one bearing further comprises a second race having an axially extending portion defining a track for said rolling elements and a radially extending portion rigid with the other of said flywheels.

50. The apparatus of claim 49, wherein one of said races surrounds the other of said races and is rigid with said second flywheel.

51. The apparatus of claim 22, wherein said at least one bearing comprises an inner race rigid with one of said flywheels and an outer race rigid with the other of said flywheels, each of said races having a radially outwardly extending flange-like portion.

52. The apparatus of claim 22, wherein said at least one bearing includes a race having a radially extending portion in rigid connection with said second flywheel wherein said second flywheel is provided with openings in at least partial alignment with said holes.

53. The apparatus of claim 22, wherein an enlarged portion of said fasteners constitute heads disposed between said holes of said first flywheel and said openings of said second flywheel in inserted condition of said fasteners.

* * * * *

UNITED STATES PATENT AND TRADEMARK OFFICE
CERTIFICATE OF CORRECTION

PATENT NO. : 5,415,261  
DATED : May 16, 1995  
INVENTOR(S) : Oswald Friedmann

It is certified that error appears in the above-identified patent and that said Letters Patent is hereby corrected as shown below:

<u>Column 19, line 56, Column 29, line 7,</u>
Amend claim 2 as follows:
-- 2.   An apparatus for transmitting torque, said apparatus being a pre-mounted unit for use between a driving motor and a transmission, comprising:
a flywheel (2, 3), a clutch (4) being attached to said flywheel and having a pressure plate (54), a clutch plate (5) centrally located between a friction surface (25) of the flywheel (3) and a friction surface of the pressure plate (54), a pressure plate (54), whereby the flywheel has holes (7) for receiving fastening means (8) for the fastening of the pre-mounted unit to an output element (75), said fastening means (8) being fixedly attached to said unit, a diaphragm spring (57) having an inwardly projecting prong (57a) in an area of said clutch plate (5), said prong having a first plate-spring opening (58), said clutch plate (5) being coupled to said pressure plate (54), said clutch plate (5) having a second plate-spring opening (55), said plate-spring openings (55, 58) being at least partially axially overlapping with respect to said holes (7) in said flywheel and are formed to accommodate passage of a tool for the movement of said fastening means. --

Signed and Sealed this

Eighteenth Day of June, 2002

*Attest:*

*Attesting Officer*

JAMES E. ROGAN  
*Director of the United States Patent and Trademark Office*